US009434137B2

(12) United States Patent
Prudhomme et al.

(10) Patent No.: US 9,434,137 B2
(45) Date of Patent: Sep. 6, 2016

(54) THERMAL SPRAY MASKING TAPE

(75) Inventors: Cheryl A. Prudhomme, Fort Edward, NY (US); James Holtzinger, Clifton Park, NY (US); Gene H. Goldstein, Newton, MA (US); Michael J. Tzivanis, Chicopee, MA (US); William E. Noonan, Saratoga, NY (US); Richard J. Austin, Clifton Park, NY (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 486 days.

(21) Appl. No.: 12/885,178

(22) Filed: Sep. 17, 2010

(65) Prior Publication Data

US 2011/0070795 A1 Mar. 24, 2011

Related U.S. Application Data

(63) Continuation-in-part of application No. 12/536,964, filed on Aug. 6, 2009, now abandoned.

(51) Int. Cl.
| | |
|---|---|
| *B32B 7/12* | (2006.01) |
| *B32B 25/20* | (2006.01) |
| *B32B 27/12* | (2006.01) |
| *C09J 7/02* | (2006.01) |
| *B32B 37/12* | (2006.01) |
| *B32B 37/24* | (2006.01) |
| *B32B 38/00* | (2006.01) |

(52) U.S. Cl.
CPC ............... *B32B 25/20* (2013.01); *B32B 27/12* (2013.01); *C09J 7/0296* (2013.01); *B32B 37/12* (2013.01); *B32B 2037/243* (2013.01); *B32B 2038/0076* (2013.01); *B32B 2305/30* (2013.01); *B32B 2307/306* (2013.01); *B32B 2307/554* (2013.01); *B32B 2309/12* (2013.01); *B32B 2310/0806* (2013.01); *B32B 2310/0887* (2013.01); *B32B 2319/00* (2013.01); *C09J 2203/31* (2013.01); *C09J 2483/006* (2013.01); *Y10T 428/2848* (2015.01); *Y10T 428/31663* (2015.04); *Y10T 442/2631* (2015.04)

(58) Field of Classification Search
CPC .......... B32B 25/20; B32B 2310/0887; B29K 2083/005; C09J 2400/263
See application file for complete search history.

(56) References Cited

U.S. PATENT DOCUMENTS

| | | | |
|---|---|---|---|
| 3,619,256 A * | 11/1971 | Pepe et al. ..................... 428/429 |
| 3,696,090 A | 10/1972 | Lampe | |
| 3,782,379 A | 1/1974 | Lampe | |
| 3,897,376 A | 7/1975 | Lampe | |
| 4,246,313 A * | 1/1981 | Stengle, Jr. .................. 442/136 |
| 4,428,999 A | 1/1984 | George et al. | |
| 4,839,206 A * | 6/1989 | Waldenberger .............. 428/41.5 |
| 4,857,564 A | 8/1989 | Maxson | |
| 4,988,550 A | 1/1991 | Keyser et al. | |
| 4,994,317 A * | 2/1991 | Dugan et al. .................... 442/72 |
| 5,130,163 A | 7/1992 | Clingman et al. | |
| 5,322,727 A | 6/1994 | Yankus et al. | |
| 5,475,124 A * | 12/1995 | Mazurek et al. .............. 556/419 |
| 5,508,097 A | 4/1996 | Hauser et al. | |
| 5,691,018 A | 11/1997 | Kelley et al. | |
| 5,789,084 A * | 8/1998 | Nakamura et al. ........... 428/447 |
| 5,902,329 A | 5/1999 | Hoffmann et al. | |
| 6,379,806 B1 * | 4/2002 | Takamura ............... B29C 33/68 252/511 |
| 2005/0084657 A1 | 4/2005 | Minoru et al. | |
| 2006/0115656 A1 | 6/2006 | Martin | |
| 2007/0110942 A1 | 5/2007 | Shah et al. | |
| 2009/0155577 A1 * | 6/2009 | Anderson ................... C08J 5/04 428/336 |
| 2010/0035501 A1 * | 2/2010 | Prudhomme et al. ........ 442/399 |
| 2010/0139707 A1 | 6/2010 | Boonstra et al. | |
| 2010/0173092 A1 | 7/2010 | Wachter | |

FOREIGN PATENT DOCUMENTS

| | | | |
|---|---|---|---|
| CA | 2095572 | 11/1993 | |
| DE | WO 2008145485 A1 * | 12/2008 | ............... C08K 9/04 |
| EP | 0431881 A2 * | 6/1991 | ............... C08L 83/04 |
| JP | 52-027178 A | 7/1977 | |
| JP | 54-143463 A | 11/1979 | |
| JP | S62-277474 A | 12/1987 | |
| JP | 03-158451 A | 7/1991 | |
| JP | 04-039036 A | 2/1992 | |
| JP | 06-032909 A | 2/1994 | |
| JP | H06-93226 A | 4/1994 | |
| JP | H07-228786 A | 8/1995 | |
| JP | 08-503496 A | 4/1996 | |
| JP | 09-176817 A | 7/1997 | |
| JP | 2001-347202 A | 12/2001 | |
| JP | 2004-079832 A | 3/2004 | |

(Continued)

OTHER PUBLICATIONS

Mitsuya Keiichi et al., "Masking Tape for Manufacturing Capacitor", machine translation of JP 2004-079832 A, Mar. 11, 2004.*
Istavan Benedek et al., Pressure-Sensitive Adhesives Technology, 1997, Marcel Dekker, Inc., p. 455.*
"Silicones", Encyclopedia of Polymer Science and Technology,2002, John Wiley & Sons Inc., vol. 11, pp. 765-766, 795-801.*
Material Product Data Sheet for Masking Tapes for Thermal Spray, Sulzer Metco, 2012.*
Product Data Sheet for CHR (trademark) Pressure Sensitive Adhesive Tapes, Saint-Gobain Performace Plastics, Nov. 18, 2007, archived from Internet Archive WaybackMachine on Mar. 29, 2013.*

(Continued)

*Primary Examiner* — Alicia Chevalier
*Assistant Examiner* — Anish Desai
(74) *Attorney, Agent, or Firm* — Abel Law Group, LLP; Thomas Osborn (57) ABSTRACT

A thermal spray masking tape includes a substrate having a first major surface and a second major surface. The thermal spray masking tape further includes a surface layer overlying the first major surface of the substrate. The surface layer is formed from an elastomer including a liquid silicone rubber.

15 Claims, 3 Drawing Sheets

(56) References Cited

FOREIGN PATENT DOCUMENTS

| JP | 2005-534481 A | 11/2005 |
|---|---|---|
| WO | 2010017380 A2 | 2/2010 |
| WO | 2012037463 A2 | 3/2012 |

OTHER PUBLICATIONS

Harry R. Allcock et al., "Contemporary Polymer Chemistry", 2003, Pearson Education, Inc., 3rd edition, pp. 524-525.*
An article titled "Understanding Hardness" byPolyOne GLS, retrived on Jul. 26, 2013.*
A brochure titled "Silbione LSR for food contact, phamaceutical contact and health care applications" from Bluestar Silicones, retrived on Aug. 4, 2013.*
A brochure titled "Elastosil LR 3003/50 A/B", from Wacker Silicones, retrived on Aug. 4, 2013.*
Yoshihiro, Nakano et al., "Masking tape for thermal spraying", English translation of Japanese Patent Application Publication No. 03158451, publication date Jul. 8, 1991.*
Brochure of Kevlar(trademark) fiber from DuPont. Retrived on May 27, 2014.*
International Search Report from PCT/US2011/051942, 1 pg.
International Search Report from PCT/US2009/052990, 1 pg.
"Effective Thermal Spray Solutions" Stokvis Tapes, 8 pgs <www.stokvistapes.co.uk>.
Bryon E. Wolf, "Comparing Liquid and High Consistency Silicone Rubber Elastomers: Which is Right for You?", Medical Device and Diagnostic Industry (MDDI), published on Jul. 1, 1997.
An article titled "Understanding Hardness" by PolyOne GLS, retrieved on Jul. 26, 2013.

* cited by examiner

THERMAL SPRAY MASKING TAPE

CROSS-REFERENCE TO RELATED APPLICATIONS

The present application claims priority from U.S. Utility patent application Ser. No. 12/536,964, filed Aug. 6, 2009, entitled "THERMAL SPRAY MASKING TAPE," naming inventors Cheryl A. Prudhomme, James Holtzinger, Gene H. Goldstein, Michael J. Tzivanis, William E. Noonan and Richard J. Austin, which claims priority from U.S. Provisional Patent Application No. 61/087,489, filed Aug. 8, 2008, entitled "THERMAL SPRAY MASKING TAPE," naming inventors Cheryl A. Prudhomme, James Holtzinger, Gene H. Goldstein, Michael J. Tzivanis, William E. Noonan and Richard J. Austin, which applications are incorporated by reference herein in their entirety.

FIELD OF THE DISCLOSURE

This disclosure, in general, relates to thermal spray masking tape.

BACKGROUND

Plasma or flame spraying of parts is a known technique for applying a protective metal or ceramic coating to the part. Such process provides a thermal spray coating over the part by bringing the metal or ceramic to the melting point and spraying on a surface to produce a thin coating. Plasma spray coating typically is achieved using a plasma gun or similar device.

In the plasma spray process, it is important to mask certain areas of the parts in order to prevent application of the coating. Reasons for masking parts include preventing the coating from entering apertures in the part, maintaining dimensions within a critical range, weight savings and the like. To achieve such masking, a masking tape is applied over the areas in which the coating is not desired.

The masking tape must exhibit excellent thermal and abrasion-resistance, both in protecting adjacent surfaces from the grit blasting that is typically used as a surface preparation and the actual plasma spray coating. Such tape must not lift off or fray during this demanding process and are designed to quickly and easily release from the part surface without leaving an adhesive residue.

Conventional plasma spray tapes typically include a glass fabric, which may or may not be treated. The plasma spray tapes may include a low molecular weight liquid silicone compound top coat and a high temperature silicone pressure sensitive adhesive back coat. A release liner is usually employed for convenient handling. Other types of masking tapes include a thin aluminum foil laminated to a fiber glass cloth.

Although such masking tapes are effective with the typical plasma spray process, they are not effective with a recently introduced, more demanding process known as a high velocity oxy-fuel (HVOF) process. This process is a continuous combustion process in which the spray gun is essentially a rocket in which the powder is injected into the exhaust stream. The exhaust stream is exiting at hypersonic speed (several thousand feet per second).

As such, an improved thermal spray masking tape and a method of forming an improved tape would be desirable.

SUMMARY

In a particular embodiment, a thermal spray masking tape includes a substrate having a first major surface and a second major surface, and a surface layer overlying the first major surface of the substrate. The surface layer is formed from an elastomer including a liquid silicone rubber.

In an embodiment, a thermal spray masking tape includes a substrate having a first major surface and a second major surface, and a surface layer overlying the first major surface of the substrate. The surface layer is formed of a liquid silicone rubber. The tape has resistance to high temperature, high pressure, and high velocity during the HVOF process.

In another embodiment, a method of forming a thermal spray masking tape includes providing a substrate having first and second major surfaces and overlying a surface layer on the first major surface of the substrate. The surface layer is formed from an elastomer including a liquid silicone rubber.

BRIEF DESCRIPTION OF THE DRAWINGS

The present disclosure may be better understood, and its numerous features and advantages made apparent to those skilled in the art by referencing the accompanying drawing.

FIG. 1 includes an illustration of an exemplary thermal spray masking tape;

FIG. 2 is a flow chart illustrating a method of forming a thermal spray masking tape; and FIG. 3 is a flow chart illustrating a method of spray coating an article.

DESCRIPTION OF THE DRAWINGS

In a particular embodiment, a thermal spray masking tape includes a substrate having a first major surface and a second major surface. The thermal spray masking tape includes a surface layer overlying the first major surface. In an embodiment, the surface layer may be disposed directly on and directly contacts the first major surface of the substrate without any intervening layers or tie layers. In particular, the surface layer provides desirable adhesion to the substrate. Further, the thermal spray masking tape has desirable resistance to high temperature, high pressure, and high velocity associated with high velocity oxy fuel (HVOF) processes.

An exemplary embodiment of a thermal spray masking tape 100 is illustrated in FIG. 1. The thermal spray masking tape includes a substrate 102 having a first major surface 104 and a second major surface 106. Disposed over the first major surface 104 of the substrate 102 is a surface layer 108. In an embodiment, an adhesive layer 110 may be disposed over the second major surface 106 of the substrate 102. The thermal spray masking tape 100 may include a mid layer (not illustrated) that is disposed between the substrate 102 and the surface layer 108. In an embodiment, the thermal spray masking tape 100 may include a mid layer (not illustrated) that is disposed between the substrate 102 and the adhesive layer 110. Further, the thermal spray masking tape 100 may include a kiss coat adhesive layer 112 overlying the surface layer 108. In an embodiment, the thermal spray masking tape 100 may include a mid layer (not illustrated) that is disposed between the surface layer 108 and the kiss coat adhesive layer 112.

The substrate 102 of the thermal spray masking tape may be flexible and may be made of various materials. An exemplary flexible substrate includes an organic or inorganic material. Substrates may be woven or nonwoven high temperature materials (i.e., materials that can withstand temperatures greater than about 300° F.) Exemplary substrates include materials such as silicones, polyurethanes, acrylics, aramids, polyamides; cloth including glass fibers, ceramic fibers, carbon fibers, and silicate fibers; any combination thereof or any treated version thereof. In an embodiment, the cloth is woven. In an embodiment, the cloth is nonwoven, such as felt. In particular examples, the substrate may be treated to improve fray resistance, adhesion migration, layer bonding, or the like. Any suitable treatment, primer, or coating may be used to improve the substrate for thermal spray masking tape applications. For instance, the substrate material may include an epoxy coat, silicone barrier coat, or the like.

Figure 1:
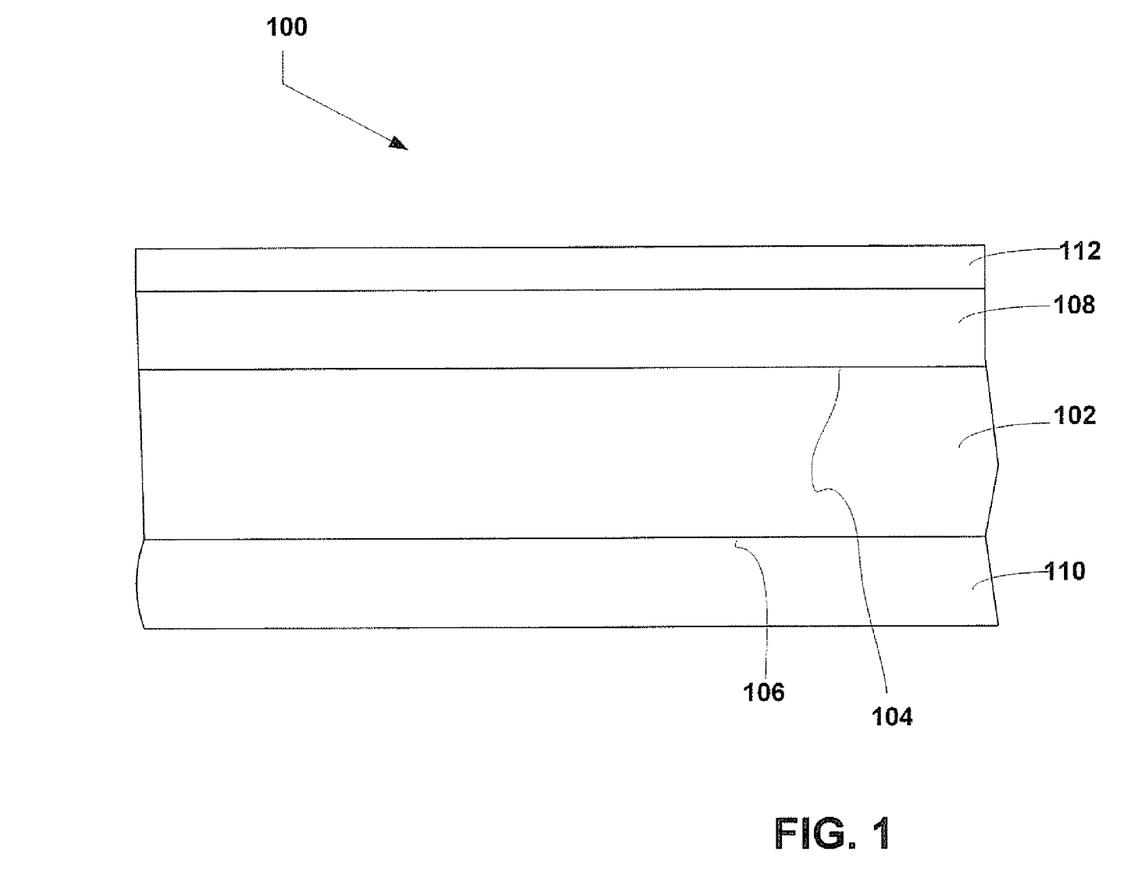

Typically, the substrate 102 has a thickness of not greater than about 10 mils, such as about 1 mil to about 10 mils. For example, the substrate 102 may have a thickness of about 2 mils to about 4 mils.

In an exemplary embodiment, the surface layer 108 is formed from a material having desirable elastomeric properties. For example, the material is an elastomer (i.e., an elastomer compound) having a durometer (Shore A) of about 20 to about 90, such as about 30 to about 80, or even about 40 to about 70. Further, the elastomer may have a density of about 0.030 lbs/cubic inch to about 0.300 lbs/cubic inch, such as about 0.035 lbs/cubic inch to about 0.150 lbs/cubic inch, or even about 0.040 lbs/cubic inch to about 0.050 lbs/cubic inch. In an embodiment, the elastomer has an elongation of greater than about 200%, such as greater than about 250%, such as greater than about 300%. In an embodiment, the elastomer may have a number average molecular weight (Mn) of greater than about 25,000, such as greater than about 75,000, or even greater than about 100,000.

In an embodiment, the elastomer has high tensile strength as measured by ASTM D412. In an exemplary embodiment, the elastomer has an ultimate tensile strength of greater than about 600 lbs/square inch, such as greater than about 650 lbs/square inch, such as greater than about 700 lbs/square inch, such as greater than about 750 lbs/square inch, or even greater than about 800 lbs/square inch. In an embodiment, the elastomer has a low tensile set as measured by ASTM D412. In an exemplary embodiment, the elastomer has a tensile set of less than about 50%, such as less than about 40%, such as less than about 30%, such as less than about 20%, such as less than about 15%, such as less than about 10%, such as less than about 5%, or even less than about 2%. In an embodiment, the elastomer has a combination of both high tensile strength and low tensile set. For instance, the elastomer may have a tensile strength of greater than about 600 lbs/square inch and a tensile set of less than about 50%. In an embodiment, the elastomer may have a tensile strength of greater than about 650 lbs/square inch and a tensile set of less than about 20%. In an embodiment, the elastomer may have a tensile strength of greater than about 800 lbs/square inch and a tensile set of less than about 10%.

In an embodiment, the material having desirable elastomeric properties is a crosslinkable elastomeric polymer. In an embodiment, the elastomer may contain additives including, but not limited to, fillers, lubricants, stabilizers, crosslinkers, accelerators, adhesion aides, dispersion aides, inhibitors, colorants, pigments, any combination thereof, and the like. For instance, a fire retardant filler such as ceramic powder, metal, glass, metal oxides, amorphous silica, or combinations thereof may be used.

In an example, the surface layer 108 may include a silicone rubber. The silicone rubber may include a catalyst and other optional additives. In an example, the silicone formulation may be a high consistency gum rubber (HCR). In an embodiment, the high consistency gum rubber may be peroxide catalyzed. In a particular embodiment, the silicone formulation may be a liquid silicone rubber (LSR). In a particular embodiment, LSRs are typically a 1 or 2 part system that are platinum catalyzed, peroxide catalyzed, or combination thereof. In an embodiment, the surface layer 108 may have a multi-layer construction. For instance, the surface layer 108 may have a first layer of a liquid silicone rubber and a second layer of a high consistency gum rubber. In a particular embodiment, the liquid silicone rubber may overlie the substrate 102 and the high consistency gum rubber overlies the liquid silicone rubber. Any number of layers are envisioned for the surface layer 108.

In a particular embodiment, the liquid silicone rubber may be a commercially prepared silicone polymer. The commercially prepared silicone polymer typically includes the silicone polymer, a catalyst, a filler, and optional additives. In an exemplary embodiment, a conventional, commercially prepared silicone polymer is available as a two-part reactive system. Part 1 typically includes a vinyl-containing polydialkylsiloxane, a filler, and catalyst. Part 2 typically includes a hydride-containing polydialkylsiloxane and optionally, a vinyl-containing polydialkylsiloxane and other additives. A reaction inhibitor may be included in Part 1 or Part 2. Mixing Part 1 and Part 2 by any suitable mixing method produces the silicone formulation.

Particular embodiments of commercially prepared LSR include Wacker Elastosil® LR 3003/50 by Wacker Silicone of Adrian, Mich. and Rhodia Silbione® LSR 4340 by Rhodia Silicones of Ventura, Calif. In another example, the silicone polymer is an HCR, such as Wacker Elastosil® R4000/50 available from Wacker Silicone.

In an embodiment, the material of the surface layer 108 is calendered onto the substrate 102. In another embodiment, the material of the surface layer 108 is applied on the substrate 102 by coating techniques such as reverse roll or knife over roll. In an embodiment, the material of the surface layer 108 may be partially cured of fully cured. For instance, the resulting composite is exposed to heat, pressure, or a combination thereof for a sufficient time to cross-link or cure the surface layer 108. Other methods suitable to cross-link the surface layer 108 may include radiation, such as using x-ray radiation, gamma radiation, ultraviolet electromagnetic radiation, visible light radiation, electron beam (e-beam) radiation, or any combination thereof. Thermal cure typically occurs at a temperature greater than about 150° C. Typical pressure that may be applied during cross-linking is in a range of about 0 psi to about 50,000 psi, such as about 100 psi to about 30,000 psi, or even about 200 psi to about 10,000 psi. In an embodiment, the pressure applied during cross-linking may be greater than about 150 psi, such as greater than about 500 psi, such as greater than about 1000 psi, such as greater than about 5,000 psi, or even greater than about 8,000 psi. Ultraviolet (UV) radiation may include radiation at a wavelength or a plurality of wavelengths in the range of from 170 nm to 400 nm, such as in the range of 170 nm to 220 nm. In an exemplary embodiment, the surface layer 108 may be cured through thermal/pressure methods.

Typically, the surface layer 108 has a thickness of about 0.5 mils to about 200 mils, such as about 5 mils to about 100 mils, or even about 10 mils to about 30 mils. In a particular embodiment, the surface layer 108 is bonded directly to and directly contacts the substrate 102. In an embodiment when multiple layers are used for the surface layer 108, for example, a first layer of an LSR and a second layer of an HCR, the total thickness of the surface layer is typically about 0.5 mils to about 200 mils, such as about 5 mils to about 100 mils, or even about 10 mils to about 30 mils. For example, the surface layer 108 may be directly bonded to and directly contact the substrate 102 without any intervening layer or layers. In an embodiment, an optional mid layer (not illustrated) may be disposed between the surface layer 108 and the substrate 102.

The thermal spray masking tape 100 may also, optionally, include an adhesive layer 110 overlying the second major surface 106 of the substrate 102. In an embodiment, the adhesive layer 110 may be disposed directly on and directly contacts the second major surface 106 of the substrate 102 without any intervening layers or tie layers. In an embodiment, the optional mid-layer may be disposed between the adhesive layer 110 and the substrate 102. The adhesive layer 110 is any suitable material that can withstand the HVOF plasma process as well as adhere to the layer it directly contacts. In an embodiment, the adhesive layer 110 includes a polymer constituent. The polymer constituent may include a monomeric molecule, an oligomeric molecule, a polymeric molecule, or a combination thereof. The polymer constituents can form thermoplastics or thermosets. Exemplary polymers include silicone, acrylics, rubbers, urethanes, and the like. In an exemplary embodiment, the adhesive layer 110 is a pressure sensitive adhesive. For instance, the pressure sensitive adhesive may be a silicone polymer based adhesive. In an embodiment, the adhesive layer 110 is formed of a peroxide cured silicone pressure-sensitive adhesive (PSA). In an embodiment, the silicone pressure-sensitive adhesive includes high molecular weight linear siloxane polymers and a highly condensed silicate tackifying resin, such as MQ resin. Exemplary silicone PSAs include polydimethylsiloxane (PDMS) polymer, polydiphenylsiloxane (PDPS) polymer, and polydimethyldiphenylsiloxane (PDMDPS) polymer, which have silanol or vinyl functional groups at the polymer chain ends. In an exemplary embodiment, the adhesive layer 110 is a high temperature methyl phenyl silicone adhesive. In yet another embodiment, a blend of two or more silicone pressure-sensitive adhesives may be used.

The adhesive layer 110 may optionally include at least one non-flammable additive, which may be ceramic powder, metal, glass, metal oxides, amorphous silica, or combinations thereof. Examples of fire resistant additives contemplated are ferro oxide, titanium oxide, boron nitride, zirconium oxide, sodium silicate, magnesium silicate, and the like.

In an example, the adhesive layer 110 may be cured through an energy source. The selection of the energy source depends in part upon the chemistry of the formulations. The amount of energy used depends on the chemical nature of the reactive groups in the precursor polymer constituents, as well as upon the thickness and density of the adhesive layer. Curing parameters, such as exposure, are generally formulation dependent and can be adjusted. Suitable forms of cure include, for example, thermal cure, pressure, or radiation, such as using x-ray radiation, gamma radiation, ultraviolet electromagnetic radiation, visible light radiation, electron beam (e-beam) radiation, or any combination thereof.

Typically, the adhesive layer 110 has a thickness of less than about 15 mils, such as about 0.5 mils to about 10 mils, such as about 1 mil to about 5 mils, or even about 2 mils to about 3 mils. In a particular embodiment, the adhesive layer 110 is bonded directly to and directly contacts the substrate 102. For example, the adhesive layer 110 may be directly bonded to and directly contact the substrate 102 without any intervening layers.

In an embodiment, the thermal spray masking tape 100 may include the optional mid layer (not illustrated). In an embodiment, the mid layer may be disposed between the substrate 102 and surface layer 108, between the substrate 102 and adhesive layer 110, between the surface layer 108 and the kiss coat adhesive layer 112, or any combination thereof. An exemplary mid layer may include any material that improves the mechanical properties of the thermal spray masking tape 100. In an embodiment, the mid layer is a material that improves the fire resistance of the thermal spray masking tape. The mid layer may be an organic or inorganic material. Any suitable organic or inorganic material that can withstand temperatures greater than about 100° F., such as greater than about 200° F., or even greater than about 300° F. can be used. For instance, the mid layer may include a metal foil, such as aluminum, copper, steel, and the like; KEVLAR®; ceramic-based sheet; glass-based sheet; a silicone elastomer; wool paper; carbon paper; polymeric materials such as polyester film, polyimide film, polyamide paper, polyamide felt, and the like. Exemplary materials include pressure sensitive adhesives (PSA) such as a highly cross-linked silicone adhesive, a urethane-based adhesive or coating, a silylated urethane adhesive, a LSR (liquid silicone elastomer), an epoxy-based adhesive or coating, acrylics, and combinations thereof. The thermal spray masking tape may include at least one mid layer, such as multiple mid layers of the same or different materials. In a particular embodiment, the thermal spray masking tape may include two mid layers that include two different materials. For instance, the mid layer may include a layer of a silicone elastomer and a layer of a pressure sensitive adhesive. Typically, the optional mid layer has a thickness of not greater than about 20 mils, such as about 0.5 mils to about 20 mils.

In an exemplary embodiment, the mid-layer improves barrier performance. Barrier performance includes, for example, barrier properties to silicone migration, peroxide migration, peroxide decomposition products migration, gas migration, moisture migration, or any combination thereof. Migration of the above components can adversely affect tape performance (i.e. such as substrate, adhesive, and/or kiss-coat adhesive performance over time and/or interlayer adhesion), component performance (the component is the object that the tape is applied to), or combination thereof.

In an embodiment, the kiss coat adhesive layer 112 may optionally be included in the thermal spray masking tape. For instance, the kiss coat adhesive layer 112 may overlie the surface layer 108. In an embodiment, the kiss coat adhesive layer 112 may be directly bonded to and directly contact the surface layer 108 without any intervening layer or layers. In an embodiment, the optional mid-layer may be disposed between the kiss coat adhesive layer 112 and the surface layer 108. The kiss coat adhesive layer 112 may be formed from any suitable material described for adhesive layer 110. Further, the kiss coat adhesive layer 112 may have a thickness of less than about 15 mils, such as about 0.5 mils to about 10 mils, such as about 1 mil to about 5 mils, or even about 2 mils to about 3 mils.

In an example, the kiss coat adhesive layer 112 may be cured through an energy source. The selection of the energy source depends in part upon the chemistry of the formulation of the kiss coat adhesive layer 112. The amount of energy used depends on the chemical nature of the reactive groups in the precursor polymer constituents, as well as upon the thickness and density of the formulation. Curing parameters, such as exposure, are generally formulation dependent and can be adjusted. Suitable forms of cure include, for example, thermal cure, pressure, or radiation, such as using x-ray radiation, gamma radiation, ultraviolet electromagnetic radiation, visible light radiation, electron beam (e-beam) radiation, or any combination thereof.

In an embodiment, one or more release liners (not illustrated) may optionally be included in the thermal spray masking tape 100. For instance, the release liner may overlie any adhesive layer included in the thermal spray masking tape. In an embodiment, the release liner may overlie adhesive layer 110. Any suitable material, dimensions, or forms may be used that enable the release liner to be removed easily and manually without altering the physical or function properties of the adhesive layer 110. For example, it may be a thin layer web that covers adhesive layer 110. Alternately, it may be corrugated or embossed film, such as polyolefin or PVC. It may also be a smooth plastic film or paper coated with a fluorosilicone coated release layer that does not bond to adhesive layer 110. Other release liners having similar properties are similarly contemplated. Any suitable method of overlying the release liner on an adhesive layer is similarly contemplated.

Any of the layers that are included in the thermal spray masking tape may include any suitable additive, filler, or the like to adjust density, color, toughness, heat resistance, ultraviolet resistance, ozone resistance, tackiness, abrasion resistance, or the like. Further, any number of layers may be envisioned.

Figure 2:
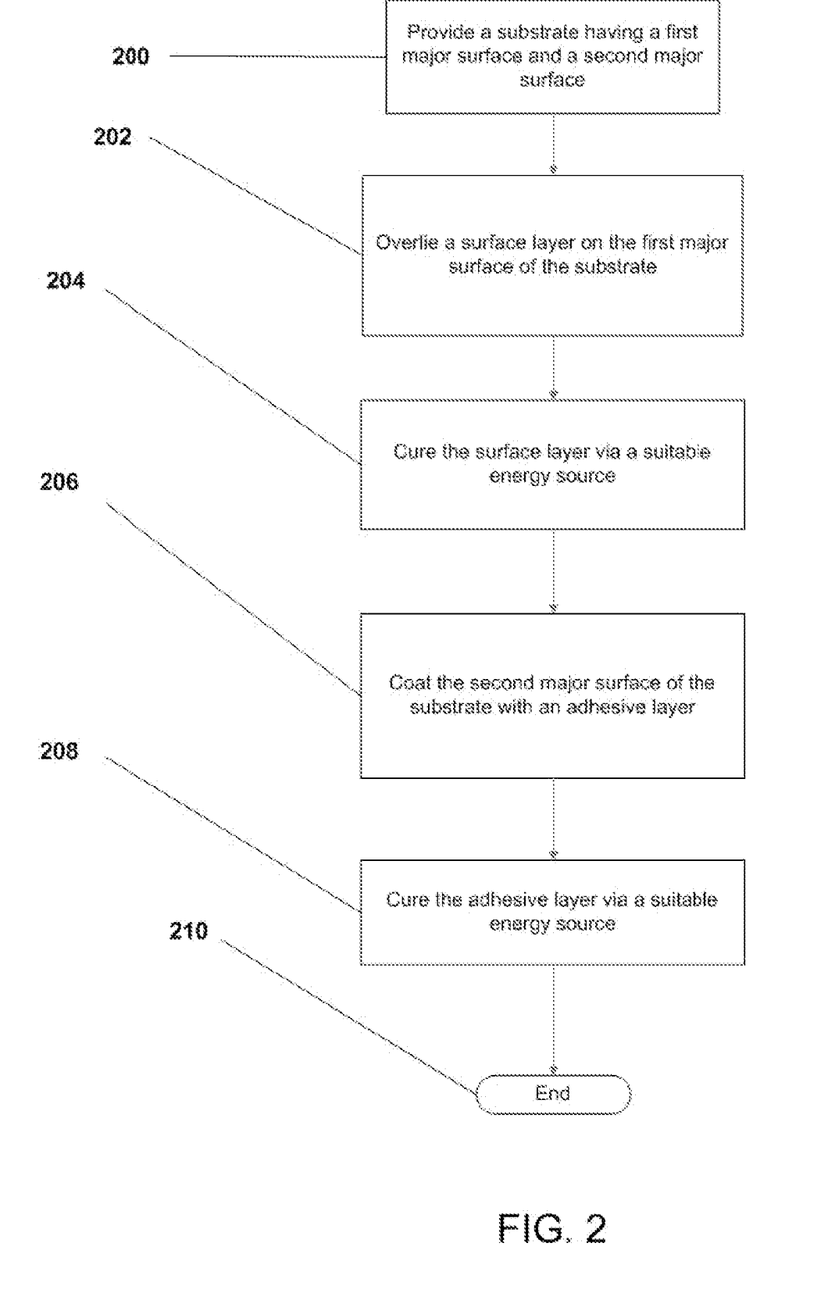

An exemplary, non-limiting embodiment of a method of forming an abrasive article is shown in FIG. 2 and commences at block 200. At block 200, a substrate is provided having a first and second major surface. As seen in block 202, the surface layer is overlaid on the substrate. Overlying the surface layer may be performed by calendering the surface layer, extrusion, coating, or injection molding. The method of overlying the surface layer is typically dependent upon the material chosen. In an exemplary embodiment, the surface layer is calendered onto the substrate. In another embodiment, the surface layer is coated onto the substrate. As seen in block 204, the surface layer may be cross-linked (cured). Cross-linking can occur via the application of an appropriate energy source. An exemplary embodiment uses thermal energy and pressure via the Rotocure press. In an embodiment, the substrate may be treated prior to overlying the surface layer on the substrate. Treatment may include any suitable primer, treatment, or coating to improve properties of the substrate such as fray resistance, adhesion migration, layer bonding, or the like. In an embodiment, an optional mid layer may be disposed on the substrate prior to overlying the surface layer. Any method of disposing the mid layer may be envisioned depending on the material used as the mid layer. For instance, the mid layer may be coated or laminated. For instance, the mid layer may be provided on the first major surface of the substrate prior to overlying the surface layer.

As seen at block 206, the second major surface of the substrate may be coated with an adhesive layer. Coating is dependent upon the material of the adhesive layer and may include extrusion coating, emulsion coating, or solution coating. In an embodiment, the substrate may be treated prior to coating the substrate with the adhesive layer. Treatment may include any suitable primer, treatment, or coating to improve the adhesion between the substrate and the adhesive layer. As seen at block 208, the adhesive layer may be cured via any suitable energy source. The selection of the energy source depends in part upon the chemistry of the formulation. In an embodiment, the optional mid layer may be provided on the second major surface of the substrate prior to providing the adhesive layer overlying the second major surface of the substrate.

Once the adhesive layer is cured, a thermal spray masking tape is formed. Alternatively, the optional kiss coat adhesive layer may be applied over the surface layer. An optional mid layer may be applied over the surface layer prior to applying the kiss coat adhesive layer. In an embodiment, one or more release liners may be placed over the adhesive layer and/or the optional kiss coat adhesive layer. In an embodiment, the thermal spray masking tape may be post-cured. The method can end at state 210.

The thermal spray masking tape may be formed into a strip, ribbon, or tape. In a particular example, the thermal spray masking tape is in the form of a tape or ribbon having length, widths, and thickness dimensions. The ratio of the length to width dimensions is at least about 10:1, such as at least about 20:1, or even about 100:1.

Figure 3:
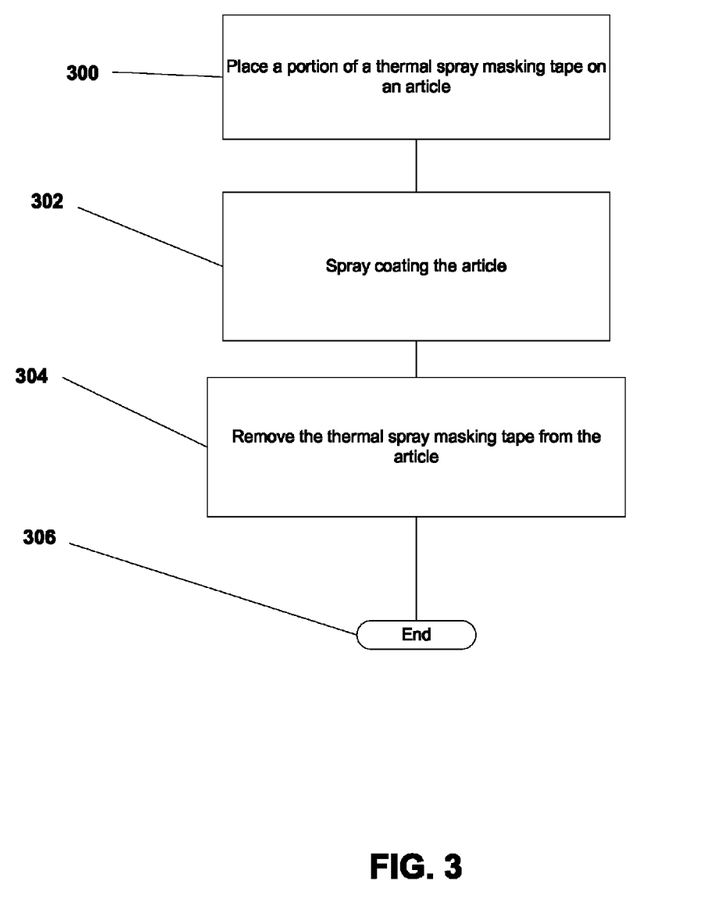

An exemplary method for spray coating an article can be seen in FIG. 3 and commences at block 300. At block 300, the method of spray coating an article includes placing a portion of the thermal spray masking tape on an article. Typically, at block 302, the article is spray coated. In an embodiment, the article is spray coated with a high velocity, high temperature, and high pressure plasma spray process, such as HVOF. At block 304, the thermal spray masking tape may be removed from the article. The method can end at state 306.

In an exemplary embodiment, the thermal spray masking tape advantageously provides an improved resistance to delamination and degradation during the HVOF process. Improved resistance is determined by thermal spray testing in accordance with the method of Example 1 below. For instance, the thermal spray masking tape does not fail after 10 passes of coating, does not delaminate upon removal, and does not stick to the steel plate test coupon. In an exemplary embodiment, the thermal spray masking tape provides a crisp demarcation and delineation at the interface of the masked area and the sprayed area, i.e. the sharpness of the coating line after tape removal is good.

EXAMPLE 1

A thermal spray masking tape is prepared for a production pilot run. Specifically, a silicone high consistency gum rubber compound (with a number average molecular weight of greater than about 75,000) is calendered onto a first surface of a substrate at a thickness of approximately 18 to 20 mils and heat-cured using a RotoCure press at a temperature of about 150° C. and a pressure of about 600 psi. The substrate is a glass cloth substrate having a thickness of about 3.7 mils with a silicone pressure sensitive adhesive coating approximately 1 to 4 mils thick on the second surface of the substrate. Test results can be seen in Table 1.

TABLE 1

|  | Tape | Surface layer |
| --- | --- | --- |
| Overall thickness (1) | 0.022 inch | N/a |
| Tensile Strength (2) | 2190 psi | 982 psi |
| Tensile Elongation (2) | 3.40% | 615% |
| Durometer | N/a | 48 (Shore A) |
| Compression Force @ 20% deflection | N/a | 103 lbs. |
| Compression Recovery @ 20% deflection | N/a | 95% |
| Compression Force @ 10% deflection | N/a | 55 lbs. |
| Compression Recovery @ 10% deflection | N/a | 100% |
| Density | N/a | 1.248 g/cc |

TABLE 1-continued

|  | Tape | Surface layer |
|---|---|---|
| Scratch Test (3) | 25 ounces | N/a |
| Off-Coater Tack | 273 grams | N/a |
| Off-Coater Adhesion to Steel | 29 oz./inch | N/a |
| Off-Coater Adhesion to Backing | 20 oz./inch | N/a |

(1) Hand held snap gage with adhesive
(2) ASTM D638 Type II Dumbell, 20 inch/min., 2 inch jaw separation - tested on tape before the adhesive is applied
(3) Gardner tester on the final tape using a pin probe

EXAMPLE 2

Two thermal spray masking tapes are prepared for mechanical testing. The first thermal spray masking tape (1) is equivalent to the tape of Example 1 but with a kiss coat adhesive layer overlying the high consistency gum rubber (HCR) surface layer and a silylated urethane adhesive mid layer between the second surface of the substrate and the silicone pressure sensitive adhesive coating. The second thermal spray masking tape (2) is equivalent to the first thermal spray masking tape of this Example with a silicone elastomer mid layer between the first surface of the substrate and the high consistency gum rubber (HCR) surface layer and a highly cross-linked silicone adhesive between the fiberglass substrate and the outside pressure sensitive adhesive layer. The peel adhesion to steel is tested using ASTM D1000. Test results can be seen in Table 2.

TABLE 2

|  | Peel Adhesion to Steel (oz./inch) | | |
|---|---|---|---|
| Sample | Initial | 1 Week Heat (120° F.) Aged | % change |
| Thermal Spray Masking Tape 1 | 63 | 69 | 10 |
| Thermal Spray Masking Tape 2 | 41 | 43 | 5 |

Both thermal spray masking tapes tested have a desirable percent change with regards to the peel adhesion to steel. It is desirable to have not greater than about 30% peel adhesion loss (i.e. at least about 70% peel adhesion retention) after one week aging test. In particular, there was not greater than about 5% to about 10% change in the peel adhesion after one week heat aged at 120° F.

EXAMPLE 3

30 mils of an LSR obtained from Momentive is coated onto fiberglass cloth to produce a masking tape for HVOF Thermal Spray applications.

For this trial, two different styles of glass are used: style 2116 which includes a primer as a "hold out' or barrier coat and style 1290 which does not include a barrier. The glass may be obtained from, for example, BGF Industries and Taiwan Glass.

The LSR is run at about 100% solids and about 83,000 centipoise (cps) viscosity. The coating may also be applied via roll coating, specifically "knife over roll", as opposed to the calendaring of 100% solids HCRs.

At the start of the trial, the thickness of the LSR is about 10 to about 12 mils. Adjustments are made to the knife and 30 mils of coating are successfully applied in a single pass.

Some of the yardage of both the 10 mil and 30 mil LSR substrates are then subsequently calendered with 10 mils of HCR on the premise that less than about 15 mils of HCR should have a relatively low decrease in adhesion and may therefore provide a viable commercial option. Construction of the tape can be found in Table 3.

TABLE 3

| Tape designation | Product DV "I" | Product DV "N" | Product DV "O" |
|---|---|---|---|
| Overall thickness | 33 mils | 25 mils | 43 mils |
| Fiberglass fabric style | 2116 | 1290 | 2116 |
| Glass primed | Yes | No | Yes |
| LSR thickness | 30 mils | 12 mils | 30 mils |
| HCR thickness | N/A | 10 mils | 10 mils |

The peel adhesion to steel is tested using ASTM D1000. Samples are also set up for oven aging at 120° F. Results can be seen in Table 4.

TABLE 4

| Peel strength (oz/inch) | 30 mil LSR on 2116 | 10 mil HCR/25 mil LSR on 2116 | 10 mil HCR/15 mil LSR on 1290 |
|---|---|---|---|
| Initial | 28 | 29 | 35 |
| 1 week | 22 | 20 | 24 |
| 2 weeks | 20 | 21 | 21 |
| 1 month | 19 | 17 | 14 |
| Total % loss in peel strength | 32 | 41 | 60 |

After a time of 1 month, the 30 mil liquid silicone rubber (LSR) on the 2116 glass substrate lost about 32% of its peel strength, which is less than the peel strength lost for the samples with the high consistency gum rubber (HCR) on the glass substrates. Clearly, the liquid silicone rubber (LSR) sample has better adhesion over time compared to the high consistency gum rubber (HCR).

Rate of erosion is also measured for the samples in Table 3. Rate of erosion is measured by subjecting the samples to a number of HVOF spray cycles and periodically measuring the change in thickness. All three samples have a comparable rate of erosion when the thickness of the sample is measured versus the number of HVOF spray cycles.

The above-disclosed subject matter is to be considered illustrative, and not restrictive, and the appended claims are intended to cover all such modifications, enhancements, and other embodiments, which fall within the true scope of the present invention.

What is claimed is:

1. A thermal spray masking tape consisting of:
   a substrate having a first major surface and a second major surface, wherein the substrate consists of a cloth including glass fibers, ceramic fibers, carbon fibers, silicate fibers, or any combination thereof;
   a surface layer consisting of a silicone rubber layer overlying the first major surface of the substrate, wherein the silicone rubber layer is a liquid silicone rubber (LSR) layer, a high consistency gum rubber layer, or combination thereof;
   a mid-layer disposed directly in contact with the substrate and directly in contact with the surface layer, wherein the mid-layer consists of a metal foil, an aramid fiber, a ceramic based sheet, a glass based sheet, a liquid silicon rubber elastomer (LSR), a polyester film, a polyimide film, a polyamide paper, a polyamide felt, or a combination thereof; and an adhesive layer directly in contact with the second major surface of the substrate.

2. The thermal spray masking tape of claim 1, wherein the mid-layer is a polyimide film.

3. The thermal spray masking tape of claim 1, wherein the silicone rubber has a Shore A durometer of about 20 to about 90.

4. The thermal spray masking tape of claim 1, wherein the surface layer has a thickness of about 5 mils to about 100 mils.

5. The thermal spray masking tape of claim 1, wherein the substrate has a thickness of about 1 mil to about 10 mils.

6. The thermal spray masking tape of claim 1, wherein the mid-layer has a thickness of about 0.5 to about 20 mils.

7. A thermal spray masking tape consisting of:
- a substrate having a first major surface and a second major surface, wherein the substrate consists of a cloth including glass fibers, ceramic fibers, carbon fibers, silicate fibers, or any combination thereof;
- a surface layer consisting of a silicone rubber layer overlying the first major surface of the substrate, wherein the silicone rubber layer is a liquid silicone rubber (LSR) layer, a high consistency gum rubber layer, or combination thereof;
- a mid-layer disposed directly in contact with the substrate and directly in contact with the surface layer, wherein the mid-layer consists of a metal foil, an aramid fiber, a ceramic based sheet, a glass based sheet, a liquid silicon rubber elastomer (LSR), a polyester film, a polyimide film, a polyamide paper, a polyamide felt, or a combination thereof;
- an adhesive layer directly in contact with the second major surface of the substrate; and
- a release liner overlying the adhesive layer.

8. The thermal spray masking tape of claim 7, wherein the silicone rubber has a Shore A durometer of about 20 to about 90.

9. The thermal spray masking tape of claim 7, wherein the mid-layer is a polyimide film.

10. The thermal spray masking tape of claim 7, wherein the mid-layer has a thickness of about 0.5 to about 20 mils.

11. The thermal spray masking tape of claim 1 or claim 7, wherein the silicone rubber has a density of about 0.035 lbs/cubic inch to about 0.150 lbs/cubic inch.

12. The thermal spray masking tape of claim 1 or claim 7, wherein the silicone rubber has a number average molecular weight (Mn) of greater than about 25,000.

13. The thermal spray masking tape of claim 1 or claim 7, having resistance to delamination and degradation after 10 passes of a high velocity oxy fuel (HVOF) coating.

14. The thermal spray masking tape of claim 1 or claim 7, wherein the surface layer has a thickness of about 5 mils to about 100 mils.

15. The thermal spray masking tape of claim 1 or claim 7, wherein the substrate has a thickness of about 1 mil to about 10 mils.

* * * * *